United States Patent
Gomadam et al.

(10) Patent No.: US 11,005,581 B1
(45) Date of Patent: May 11, 2021

(54) CALIBRATION OF AN ANTENNA ARRAY THAT USES LOW-RESOLUTION PHASE SHIFTERS

(71) Applicant: Facebook, Inc., Menlo Park, CA (US)

(72) Inventors: Krishna Srikanth Gomadam, San Jose, CA (US); Walid Ali-Ahmad, San Carlos, CA (US); Djordje Tujkovic, Mountain View, CA (US); Alireza Tarighat Mehrabani, Los Angeles, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/784,340

(22) Filed: Feb. 7, 2020

(51) Int. Cl.
| | |
|---|---|
| *H04B 17/12* | (2015.01) |
| *H01Q 3/26* | (2006.01) |
| *H04B 7/06* | (2006.01) |
| *H04B 17/10* | (2015.01) |
| *H04B 7/0408* | (2017.01) |

(52) U.S. Cl.
CPC ............ *H04B 17/12* (2015.01); *H01Q 3/267* (2013.01); *H04B 7/0408* (2013.01); *H04B 7/0617* (2013.01); *H04B 17/102* (2015.01)

(58) Field of Classification Search
CPC .... H04B 17/12; H04B 17/102; H04B 7/0408; H04B 7/0617; H01Q 3/267
See application file for complete search history.

(56) References Cited

U.S. PATENT DOCUMENTS

| | | | | |
|---|---|---|---|---|
| 5,063,529 A | * | 11/1991 | Chapoton | .............. H01Q 3/267 702/106 |
| 5,248,982 A | * | 9/1993 | Reinhardt | .............. H01Q 3/267 342/174 |
| 5,784,030 A | * | 7/1998 | Lane | ...................... H01Q 3/267 342/174 |
| 7,714,782 B2 | | 5/2010 | Davis et al. | |
| 9,155,097 B2 | | 10/2015 | Li et al. | |
| 10,680,725 B1 | * | 6/2020 | Lu | ......................... H04B 17/104 |
| 10,693,229 B2 | * | 6/2020 | Grass | .................. H04L 65/4076 |
| 2004/0166808 A1 | * | 8/2004 | Hasegawa | .............. H01Q 3/267 455/63.4 |
| 2010/0164802 A1 | | 7/2010 | Li et al. | |
| 2014/0111373 A1 | | 4/2014 | Puzella et al. | |
| 2015/0146584 A1 | * | 5/2015 | Wang | .................. H04B 7/0617 370/278 |

(Continued)

*Primary Examiner* — Jean B Corrielus
(74) *Attorney, Agent, or Firm* — Brian R. Short

(57) ABSTRACT

Apparatuses, methods, and systems for calibrating of an antenna array that uses low-resolution phase shifters, are disclosed. On method includes generating a codebook of phase-shifter setting selections for each of a plurality of antenna elements of an antenna array including communicating a wireless signal between an external calibration antenna and the antenna array through a beam formed by a reference antenna element of the antenna array and an antenna element of the antenna array being calibrated, measuring a signal power of the communicated wireless signal for each of N settings of a digitally selected phase shifter associated with the antenna element of the antenna array being calibrated, and estimating a virtual signal power of each of M settings of the digitally selected phase shifter based on the signal power measurements of the N settings of the digitally selected phase shifter, wherein M is greater than N.

20 Claims, 7 Drawing Sheets

(56) References Cited

U.S. PATENT DOCUMENTS

| | | | |
|---|---|---|---|
| 2017/0085362 A1* | 3/2017 | Alpert | H04B 17/14 |
| 2018/0062260 A1* | 3/2018 | Khalil | H04B 5/0043 |
| 2020/0169306 A1* | 5/2020 | Kim | H04B 7/0617 |
| 2020/0336221 A1* | 10/2020 | Sebastian | H01Q 21/06 |

* cited by examiner

Communicating a wireless signal between an external calibration antenna and the antenna array through a beam formed by a reference antenna element of the antenna array and an antenna element of the antenna array being calibrated

610

Measuring a signal power of the communicated wireless signal for each of N settings of a digitally selected phase shifter associated with the antenna element of the antenna array being calibrated

620

Estimating a virtual signal power of each of M settings of the digitally selected phase shifter based on the signal power measurements of the N settings of the digitally selected phase shifter, wherein M is greater than N

CALIBRATION OF AN ANTENNA ARRAY THAT USES LOW-RESOLUTION PHASE SHIFTERS

FIELD OF THE DESCRIBED EMBODIMENTS

The described embodiments relate generally to wireless communications. More particularly, the described embodiments relate to systems, methods and apparatuses for calibration of an antenna array that uses low-resolution phase shifters.

BACKGROUND

Wireless devices of a wireless network can communicate with each other using beamforming techniques. The wireless devices can include antenna arrays that form beams that facilities wireless communication between the wireless devices. Some wireless devices use low-resolution phase shifters for formation of the beams. However, low-resolution phase shifters can result in undesirable side lobes in the antenna response.

It is desirable to have methods, apparatuses, and systems for calibrating an antenna array that uses low-resolution phase shifters.

SUMMARY

An embodiment includes a method. The method includes generating a codebook of phase-shifter setting selections for each of a plurality of antenna elements of an antenna array including communicating a wireless signal between an external calibration antenna and the antenna array through a beam formed by a reference antenna element of the antenna array and an antenna element of the antenna array being calibrated, measuring a signal power of the communicated wireless signal for each of N settings of a digitally selected phase shifter associated with the antenna element of the antenna array being calibrated, and estimating a virtual signal power of each of M settings of the digitally selected phase shifter based on the signal power measurements of the N settings of the digitally selected phase shifter, wherein M is greater than N.

An embodiment includes a system for generating a codebook for an antenna array. The system includes the antenna array including a plurality of antenna elements, and an external calibration antenna. The system operates to determine a fine phase shifter calibration for each antenna element of the antenna array, comprising the system operating to communicate a wireless signal between an external calibration antenna and the antenna array through a beam formed by a reference antenna element of the antenna array and an antenna element of the antenna array being calibrated, measure a signal power of the communicated wireless signal for each of N settings of a digitally selected phase shifter associated with the antenna element of the antenna array being calibrated, and estimate a virtual signal power of each of M settings of the digitally selected phase shifter based on the signal power measurements of the N settings of the digitally selected phase shifter, wherein M is greater than N.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes steps of a method of calibrating an antenna array, according to an embodiment.

DETAILED DESCRIPTION

The embodiments described include methods, apparatuses, and systems for calibrating an antenna array that uses low-resolution phase shifters. Phase shifters of some antenna arrays are limited to low-resolutions, which hinders the proper formation of beams by these antenna arrays. For example, 6-bit phase shifters may not suffer from the problems associated with beam formation that 2-bit phase shifters suffer. The described embodiments provide for the generation of codebooks that maintain at least settings of phase shifters associated with a plurality of antennas, wherein the phase shifters are low-resolution (such as, 2-bit) phase shifters. Calibration techniques are provided that include the generation of codebooks for the low-resolution phase shifters that reduce the problems associated with low-resolution phase shifters.

Figure 1:
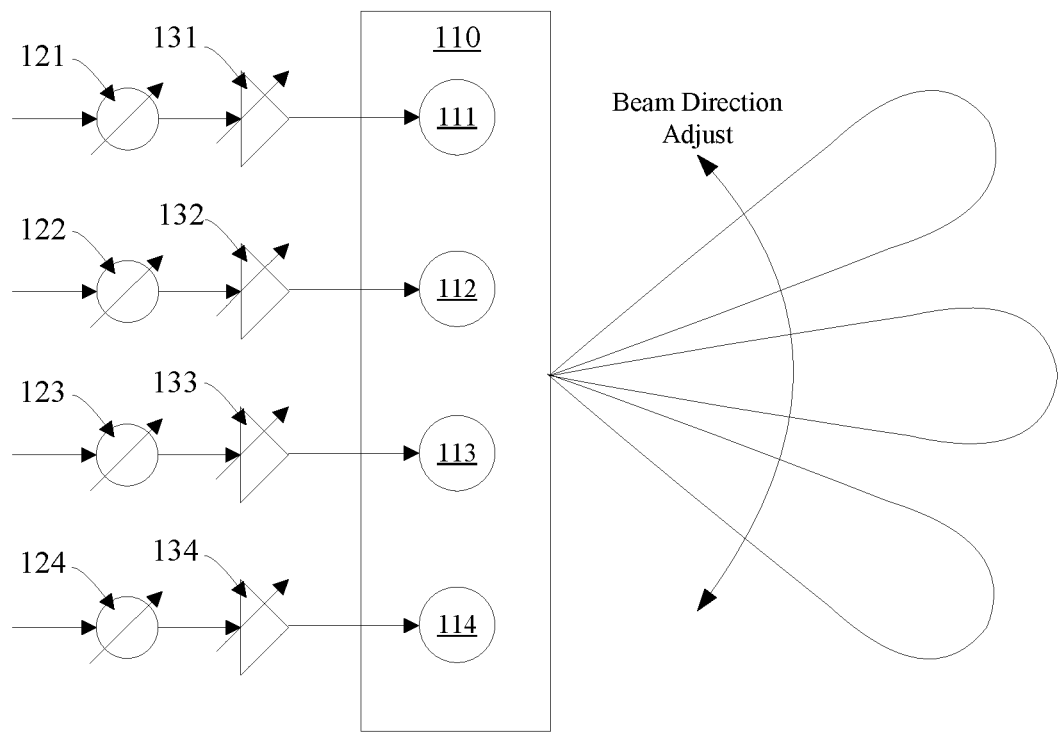
FIG. 1 shows an antenna array that includes a plurality of antenna elements along with a plurality of phase shifters and amplitude adjustors that operate to adjust a direction of a beam formed by the antenna array, according to an embodiment.

FIG. 1 shows an antenna array 110 that includes a plurality of antenna elements 111, 112, 113, 114 along with a plurality of phase shifters 121, 122, 123, 124 and a plurality of amplitude adjustors 131, 132, 133, 134 that operate to adjust a direction of a beam formed by the antenna array, according to an embodiment. Beamforming is a technique that focuses a wireless signal towards a specific receiving device (or transmitting device), rather than having the signal spread in all directions from a transmitting antenna, as it normally would. The resulting more direct (focused) connection may be faster and more reliable than it would be without beamforming.

For at least some embodiments, the antenna array 110 in a part of a wireless device or a wireless node of a wireless network. One wireless device or wireless node wirelessly communicates with another wireless device or wireless node through a beam formed by the antenna array of a transmitting or receiving one of the wireless device or wireless node.

For at least some embodiments, a direction of the beam formed by the antenna elements 111, 112, 113, 114 of the antenna array 110 is selected or adjusted by settings of the plurality of phase shifters 121, 122, 123, 124 and/or the plurality of amplitude adjustors 131, 132, 133, 134.

Figure 2:
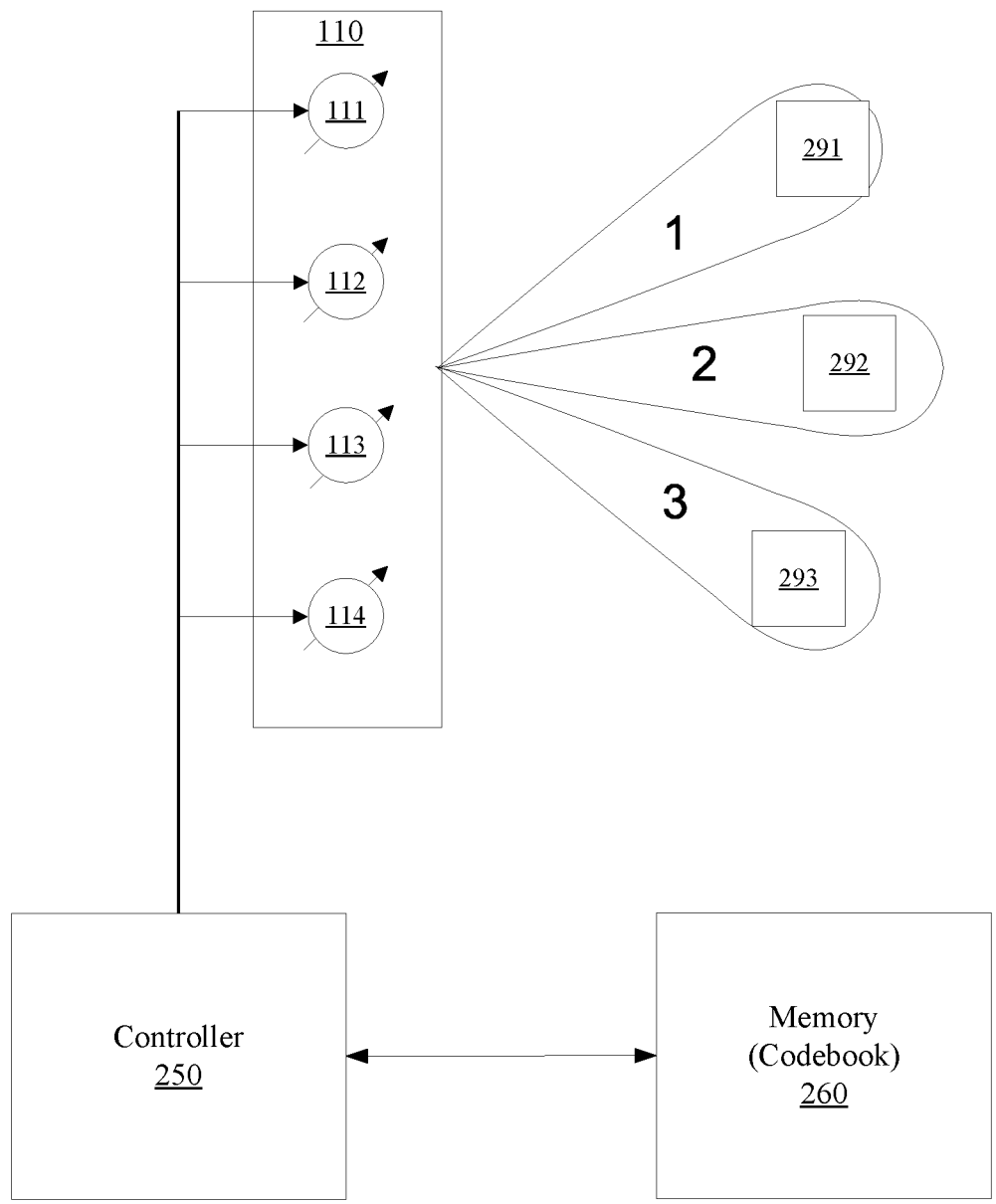
FIG. 2 shows an antenna array, a controller, and a codebook stored in memory, wherein the codebook includes phase and amplitude setting for directing a beam formed by the antenna array to be directed to one or more of a plurality of targets, according to an embodiment.

FIG. 2 shows an antenna array 110, a controller 250, and a codebook stored in memory 260, wherein the codebook includes phase and amplitude setting for directing a beam formed by the antenna array 110 to be directed to one or more of a plurality of targets 291, 292, 293, according to an embodiment. For at least some embodiments, the values of the phase settings of the phase shifters and the values of the amplitude settings of the amplitude adjusters for directing the beam formed by the antenna array 110 to different of the targets 291, 292, 293 are pre-calibrated and stored as the codebook within the memory 260. When the wireless device that includes the antenna array 110 is to communicate with a one of the different of the targets 291, 292, 293, the controller 250 accesses the corresponding phase settings and amplitude settings per the codebook from the memory 260.

Figure 3:
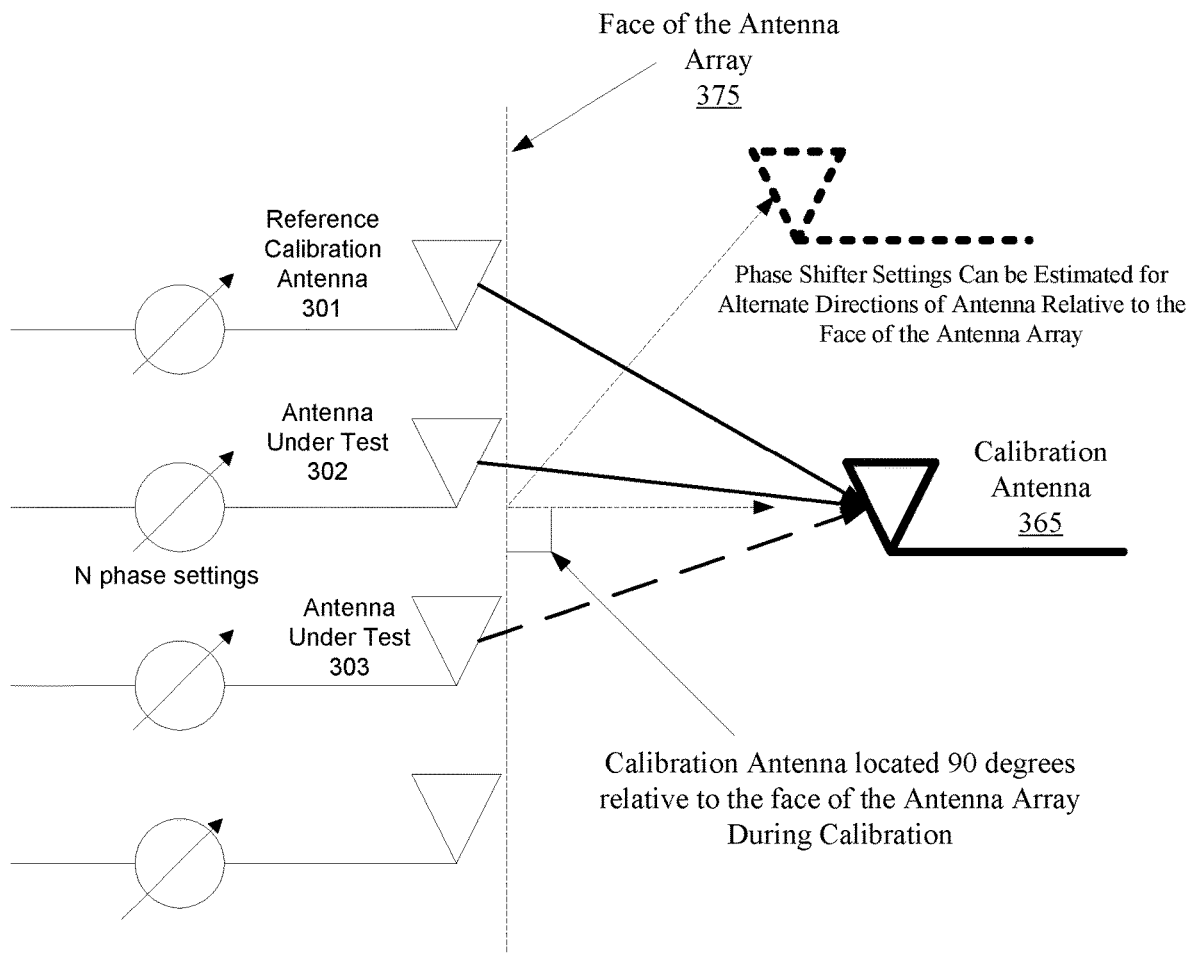
FIG. 3 shows antenna elements of an antenna array, and a calibration antenna that can be used in calibrating a phase shifter setting for a phase shifter corresponding with each of the antenna elements, according to an embodiment.

FIG. 3 shows antenna elements 301, 302, 303 of an antenna array, and a calibration antenna 365 that can be used in calibrating a phase shifter setting for the phase shifter corresponding with each of the antenna elements, according to an embodiment. For an embodiment, the calibration antenna 365 is located directly facing the antenna array. For an embodiment, the calibration antenna 365 is located at approximately a 90 degrees angle from the front face 375 of the antenna array.

For an embodiment, the antenna array includes a reference antenna 301 which is used in the calibration of each of the other antenna elements of the antenna array. For an embodiment, the phase shifter setting of the phase shifter of the reference antenna 301 is set to a reference value. For an embodiment, the reference value is a default value. However, the value of the reference value is not really important as long as the phase difference between the reference antenna and an antenna being tested against the reference antenna is known.

For an embodiment, each of the other antenna elements of the antenna array is calibrated relative to the reference antenna. For example, a first antenna element (antenna under test) 302 is calibrated by transmitting (or receiving) a wireless signal through the first antenna element 302 simultaneously with the reference calibration antenna 301 transmitting (or receiving) a wireless signal. The phase shifter setting of the reference antenna 301 is set to the selected reference value. For an embodiment, the phase shifter setting of the first antenna element (antenna under test) 302 is adjusted until the combination of the wireless signals transmitted from the reference antenna 301 and the first antenna element 302 results in a maximal (or near maximal) signal level received by the calibration antenna 365. The value of the setting of the phase shifter of the first antenna element 302 is then stored in memory. For an embodiment, the same process is then performed with a second antenna element (antenna under test) 302 to determine the setting of the phase shifter of the second antenna element (antenna under test) 302 that results in maximal (or near maximal) signal level received by the calibration antenna 365. The value of the setting of the phase shifter of the second antenna element (antenna under test) 302 is then stored in memory. This process in then repeated until settings for all of the antenna elements of the antenna array have been calibrated, and values of phase shifter settings for each of the antenna elements have been selected.

While the calibration of the antenna elements is described as including selecting a value of a setting of a phase shifter associated with each of the antenna elements, it is to be understood that the amplitude adjustment of the amplitude adjustors 131, 132, 133, 134 could be selected as well. For an embodiment, the amplitude adjustment of each of the amplitude adjustors 131, 132, 133, 134 is set to a default value. For an embodiment, the default value is selected to a mid-range setting of the amplitude adjustors, wherein the mid-range setting (or value) ensures an RF (radio frequency) chain that includes the amplitude adjustors does not saturate due to too great of a signal amplitude of signals passing through RF chain causing distortion of signals propagating through the amplitude adjustors, and the mid-range value also ensures that the signal amplitude of signals passing through the RF chain are large enough that noise (for example, low SNR) does not degrade the signals passing through the RF chain.

For an embodiment, a codebook of phase-shifter setting selections is generated for each of a plurality of antenna elements of an antenna array for a plurality of beam directions which includes determining a fine phase shifter calibration for each antenna element of the antenna array. For an embodiment, determining the fine phase shifter calibration for each antenna element of the antenna array communicating a wireless signal between the external calibration antenna and the antenna array through a beam formed by the reference antenna element of the antenna array and an antenna element of the antenna array being calibrated, and measuring a signal power of the communicated wireless signal for each of N (for example, 4 as shown in FIG. 4) settings of a digitally selected phase shifter associated with the antenna element of the antenna array being calibrated.

Once each antenna element (such as, 302, 303) of the antenna array have been calibrated relative to the calibration antenna 365, other the values of phase shifter settings can be determined for alternate directions. That is, for directions alternate or different than the direction of the original calibration direction (shown as 90 degrees from the phase of the antenna array in FIG. 3). For example, an alternate direction can be determined for an external antenna 385 of an exemplary transceiver. As will be described, various methods can be used for determining the phase shifter settings in alternate directions relative to the original calibration direction of, for example, 90 degrees from the face 375 of the antenna array.

Figure 4:
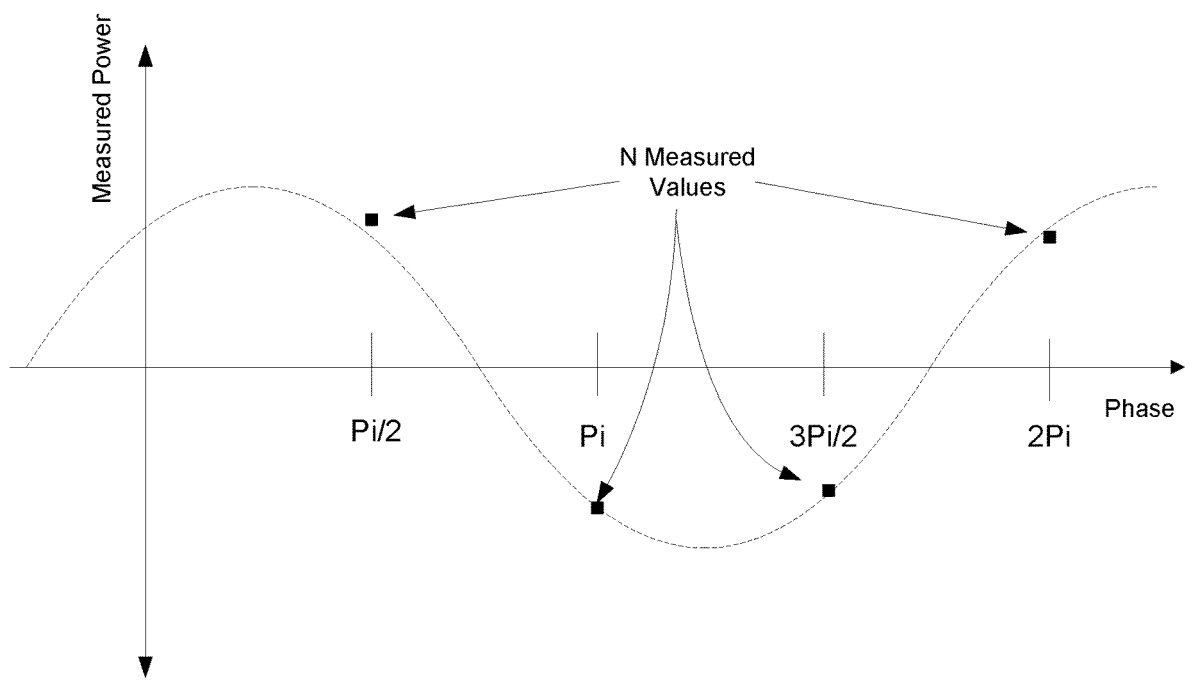
FIG. 4 shows a curve drawn between measurements of received signals for each phase shifter settings of a low-resolution phase shifter of an antenna element of an antenna array, according to an embodiment.

FIG. 4 shows a curve drawn between measurements of received signals for each phase shifter settings of a low-resolution phase shifter of an antenna element of an antenna array, according to an embodiment. As shown, amplitude measurements of a signal received by, for example, the calibration antenna 365 is shown for four (N) different phase settings of a 2-bit resolution phase shifter. Other values (such as M for a high-resolution phase shifter) of the amplitude can be estimated by approximating the values between the four measured values.

For an embodiment, the four measured values are approximated by a sine wave that at least roughly corresponds with the four measured values. Amplitudes of other phases can be approximated by the sine wave as shown in FIG. 4.

An embodiment includes estimating a virtual signal power of each of M settings of the digitally selected phase shifter based on the signal power measurements of the N settings of the digitally selected phase shifter, wherein M is greater than N. That is, virtual signal power of each of M settings of the digitally selected phase shifter based on the signal power measurements of the N settings can be estimated based on, for example, the sine wave representation shown in FIG. 4.

For an embodiment, estimating a virtual signal power of each of M settings of the digitally selected phase shifter based on the N measurements of the N settings of the digitally selected phase shifter, wherein M is greater than N includes generating the virtual signal power of each of the M setting by interpolating between the measured signal power values of the N settings.

For an embodiment, estimating the virtual signal power of each of M settings of the digitally selected phase shifter based on the N measurements of the N settings of the digitally selected phase shifter, wherein M is greater than N includes generating virtual signal power for each of the M phase settings to minimize a mean square error (MMSE) between a measured value at each phase shifter setting Y1, Y2, Y3, Y4 and an expected value for a received signal, wherein the expected value can be calculated by $1+e^{(j*\psi)}*e^{(m*pi/2)}$, wherein m corresponds with the phase shifter setting (1-4) and $\psi$ is the unknown phase. That is, the signal YN received at the calibration antenna would be 1 (due to the reference antenna)+$e^{(j*\psi)}$. That is, $\psi$ is selected to yield a minimum value of the expected received value $1+e^{(j*\psi)}*e^{(m*pi/2)}$. Accordingly, the receive values for the M settings can be estimated by varying w.

For an embodiment, estimating the virtual signal power of each of M settings of the digitally selected phase shifter based on the N measurements of the N settings of the digitally selected phase shifter, wherein M is greater than N includes selecting a phase shifter setting that maximizes a likelihood of a received signal.

Figure 5:
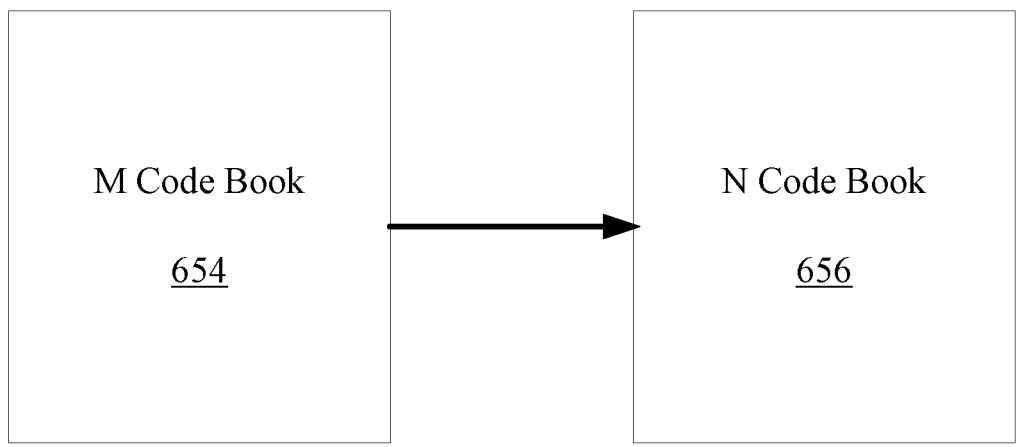
FIG. 5 shows a representation of an M codebook and an N codebook that each includes phase settings for each antenna element of an antenna array, according to an embodiment.

FIG. 5 shows a representation of an M codebook and an N codebook that each includes phase settings for each antenna element of an antenna array, according to an embodiment. As described, the N codebook can be determined by generating the reference values of the phase settings of each of the N settings (such as, four settings) of the low-resolution (such as, 2-bit) of the low-resolution phase shifter. Further, the M codebook can be determined by estimating M virtual power or amplitude levels based on the values of the N codebook.

An embodiment includes calculating an unquantized phase shifter setting for each of the antenna elements of the antenna array for generation of a beam direction of the antenna array. That is, a theoretical phase shifter has an infinite resolution. This process can be used to generate phase shifter settings for any number of possible beam directions. Once generated, the settings can be stored in the codebook for future references when transmitting or receiving in one of the possible directions.

For an embodiment, the setting of the infinite resolution beam shifter setting for any beam angle can be represented by:

k*(2*pi*d/lambda)*cos (theta), where k is the element index, theta is the beam angle, d is a spacing between the antenna elements of the antenna array, and lambda is a carrier wavelength.

For an embodiment, the phase shifter settings of each of the phase shifters of the antenna array can be determined for different (a plurality of) beam directions from the antenna array as defined by the beam angle theta. For a given carrier frequency and for a specified beam angle theta, the setting for the unquantized phase shifter can be calculated. At least some embodiments include generating the codebook of settings of each phase shifter of each antenna element of the antenna array based on the estimated the virtual signal power of each of M settings of the digitally selected phase shifter and the calculated unquantized phase shifter setting for each of the antenna elements of the antenna array for the different beam directions.

For example, for a first direction (theta1), a phase shifter setting for an antenna element k can be determined as:

Phase shifter setting=$e^{(k*(2*pi*d/lambda)*cos(theta1))}$+C wherein theta1 is an angle relative to the calibration angle of, for example, 90 degrees, and C is the value of the phase shifter setting for the antenna element k determined during the calibration of the antenna array. As previously described, theta is the beam angle per the beam direction, d is the spacing between the antenna elements of the antenna array, and lambda is a carrier wavelength. Different phase shifter settings can accordingly be determined for different beam directions by varying the beam angle theta.

As depicted and described, the phase shifter settings for each of the phase shifters of each antenna element can be determined for different directions from the face of the antenna array based on the phase shifter value determined during calibration and the theoretical value calculated for different directions. The higher resolution of M bits can provide a more accurate phase shifter setting for a particular direction. For example, a theoretical value in degrees of the phase shifter relative to the calibration direction may yield a result of 1.1 degrees. Further, for a selected direction, the calibration value of the phase shifter may yield a value of 5 degrees for the N bit phase shifter and a value of 3.7 degrees for the virtual M bit phase shifter. The selected phase shifter value for the N bit phase shifter become 1.1+5.0=6 degrees (when quantized to the nearest degree) and the selected phase shifter value for the M bit phase shifter become 1.1+3.7=5 degrees (when quantized to the nearest degree). That is, the high bit resolution of the virtual M bit phase shifter provides a different (more accurate) value of the setting of the phase shifters.

Figure 7:
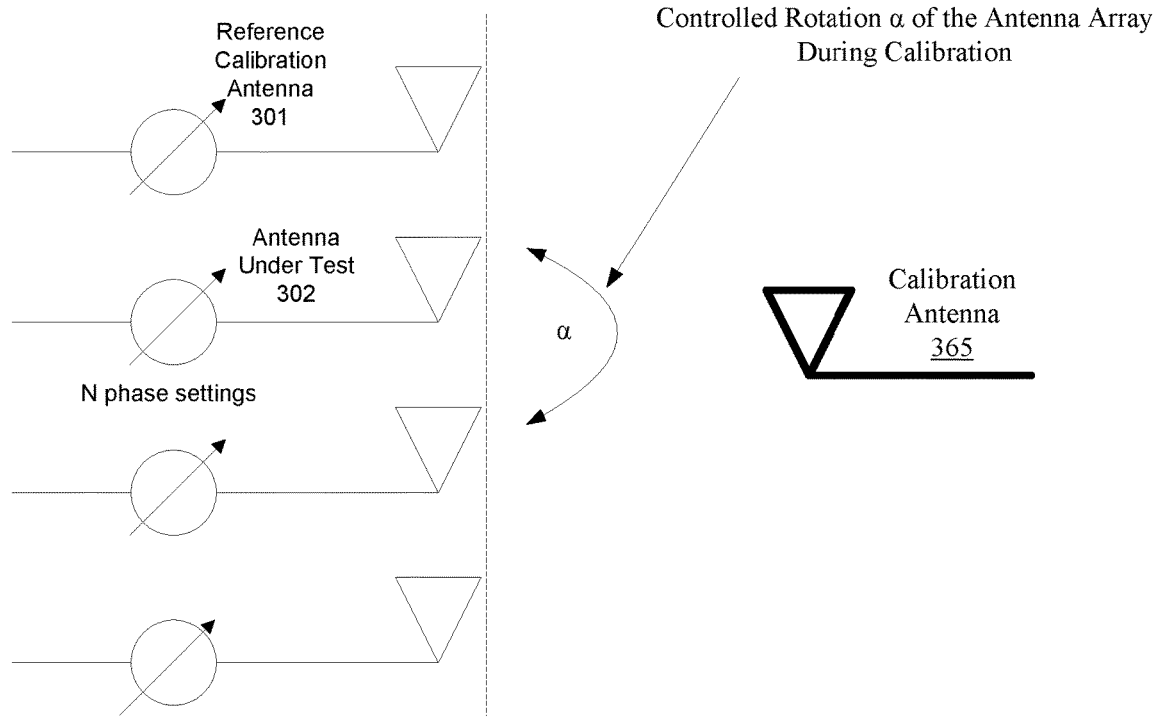
FIG. 7 shows antenna elements of an antenna array, wherein the antenna array is physically rotated during calibration of phase shifter setting for a phase shifter corresponding with each of the antenna elements, according to an embodiment.

For an embodiment, the setting of the infinite resolution beam shifter can be determined for a beam angle (beam direction) by rotating the antenna array as will be shown in FIG. 7, and described.

At least some embodiments include adjusting the N codebook of the settings of each of the phase shifters based on the digitally selected phase shifter having a resolution of N. For an embodiment, this includes selecting the one of the N phase shifter settings that is closest to the phase of the codebook for each of the possible beam directions. The selection will not be perfect, but is the best possible phase shifter setting available for the low-resolution phase shifter.

For an embodiment, after determining the M-bit resolution phase shifter codebook for the multiple (plurality) of beam directions, a wireless device that includes the antenna array operates to communicate with another device in a beam direction by retrieving a phase setting from the codebook for each antenna of the antenna array corresponding with the beam direction of the other device.

FIG. 6 is a flow chart that includes steps of a method of calibrating an antenna array, according to an embodiment. For an embodiment, that includes generating a codebook of phase-shifter setting selections for each of a plurality of antenna elements of an antenna array for a plurality of beam directions by determining a fine phase shifter calibration for each antenna element of the antenna array. For an embodiment, determining a fine phase shifter calibration for each antenna element of the antenna array includes a first step 610 of communicating a wireless signal between an external calibration antenna and the antenna array through a beam formed by a reference antenna element of the antenna array and an antenna element of the antenna array being calibrated, a second step 620 of measuring a signal power of the communicated wireless signal for each of N settings of a digitally selected phase shifter associated with the antenna element of the antenna array being calibrated, and a third step 630 of estimating a virtual signal power of each of M settings of the digitally selected phase shifter based on the signal power measurements of the N settings of the digitally selected phase shifter, wherein M is greater than N.

At least some embodiments further include calculating an unquantized phase shifter setting for each of the antenna elements of the antenna array for generation of a beam direction of the antenna array. The unquantized phase shifter includes infinite phase resolution.

For an embodiment, the resulting beam angle of an antenna element having the infinite resolution phase shifter can be represented as:

k*(2*pi*d/lambda)*cos (theta) where k is the element index and theta is the beam angle, d is the spacing between antenna elements, and lambda is the wavelength of the carrier signal being communicated through the antenna array.

For an embodiment, the beam angle (theta) is an angle relative to an angle in which the calibration antenna 365 is located. The equation k*(2*pi*d/lambda)*cos (theta) provides a phase shifter value (for example, in degrees) which can be referred to as a beam steering vector.

For at least some embodiments, a codebook of settings of each phase shifter of each antenna element of the antenna array is generated based on the estimated virtual signal power of each of M settings of the digitally selected phase shifter and the calculated unquantized phase shifter setting for each of the antenna elements of the antenna array. For an embodiment, the beam steering vector is summed with the phase shifter value generated for an antenna element during calibration with the calibration antenna 365. The summed result can be quantized yielding the phase shifter setting for different beam angles (different beam directions).

The actual phase shifter being used includes N settings, not M. Therefore, at least some embodiments include adjusting the codebook of the settings of each of the phase shifters based on the digitally selected phase shifter having a resolution of N. For an embodiment, this includes selecting the one of the N phase shifter settings that is closest to the phase of the codebook for each possible beam direction.

After the codebook has been completed, at least some embodiments include communicating with another device in a direction by retrieving a phase setting from the codebook for each antenna of the antenna array corresponding with the direction.

For at least some embodiments, estimating a virtual signal power of each of M settings of the digitally selected phase shifter based on the N measurements of the N settings of the digitally selected phase shifter, wherein M is greater than N includes generating the virtual signal power of each of the M setting by interpolating between the measured signal power values of the N settings.

For at least some embodiments, estimating the virtual signal power of each of M settings of the digitally selected phase shifter based on the N measurements of the N settings of the digitally selected phase shifter, wherein M is greater than N includes generating virtual signal power for each of the M phase settings to minimize a mean square error (MMSE) between a measured value at each phase shifter setting Y1, Y2, Y3, Y4 and an expected value for a received signal, wherein the expected value can be calculated by $1+e^{(j*\psi)})*e^{(m*pi/2)}$, wherein m corresponds with the phase shifter setting (1-4) and ψ is the unknown phase. That is, the signal YN received at the calibration antenna would be 1 (due to the reference antenna)+$e^{(j*\psi)}$. That is, ψ is selected to yield a minimum value of the expected value $1+e^{(j*\psi)}*e^{(m*pi/2)}$. Accordingly, the receive values for the M settings can be estimated by varying w.

For at least some embodiments, estimating the virtual signal power of each of M settings of the digitally selected phase shifter based on the N measurements of the N settings of the digitally selected phase shifter, wherein M is greater than N includes selecting a phase shifter setting that maximizes a likelihood of a received signal.

For at least some embodiments, adjusting the codebook of the settings of each of the phase shifters based on the digitally selected phase shifter having a resolution of N includes selecting a value of the N-bit phase shifter that results in a phase closest to a value of phase of the codebook before adjusting.

Golden Code Book

At least some embodiments include generating a golden code book by averaging the calibration of more than one antenna array. The golden code book can be used for devices that include a replica of the plurality of antenna arrays that were characterized in the generation of the gold code book. By averaging the characterizations of multiple antenna arrays, a code book (golden code book) can be generated that more accurately represents the characteristics of replica antenna arrays.

For an embodiment, the antenna array is one of a plurality of antenna arrays, and generating the golden code book for a one of the plurality of beam directions includes calibrating each antenna array of the plurality of antenna arrays, including communicating a wireless signal between an external calibration antenna and the antenna array through a beam formed by a reference antenna element of the antenna array and an antenna element of the antenna array being calibrated, measuring a signal power of the communicated wireless signal for each of N settings of a digitally selected phase shifter associated with the antenna element of the antenna array being calibrated, and estimating a virtual signal power of each of M settings of the digitally selected phase shifter based on the signal power measurements of the N settings of the digitally selected phase shifter, wherein M is greater than N. The golden code book for the one of the plurality of beam directions is generated by averaging the M settings of the plurality of antenna arrays.

For an embodiment, the antenna array is one of a plurality of antenna arrays, and generating the golden code book includes calibrating each antenna array of a plurality of antenna arrays for the plurality of beam directions, including communicating a wireless signal between an external calibration antenna and the antenna array through a beam formed by a reference antenna element of the antenna array and an antenna element of the antenna array being calibrated, measuring a signal power of the communicated wireless signal for each of N settings of a digitally selected phase shifter associated with the antenna element of the antenna array being calibrated, estimating a virtual signal power of each of M settings of the digitally selected phase shifter based on the signal power measurements of the N settings of the digitally selected phase shifter, wherein M is greater than N, calculating an unquantized phase shifter setting for each of the antenna elements of the antenna array for generation of a beam direction of the antenna array, generating a codebook of settings of each phase shifter of each antenna element of the antenna array based on the estimated the virtual signal power of each of M settings of the digitally selected phase shifter and the calculated unquantized phase shifter setting for each of the antenna elements of the antenna array. The golden code book for the plurality of beam directions is generated by averaging the codebook of settings of the plurality of antenna arrays.

FIG. 7 shows antenna elements of an antenna array, wherein the antenna array is physically rotated during calibration of a phase shifter setting for a phase shifter corresponding with each of the antenna elements, according to an embodiment. For an embodiment, the antenna array is physically rotated by an angle α while each of the antenna elements is calibrated relative to the reference antenna of the antenna array. The physical rotation α of the antenna array is monitored while performing the calibration. By monitoring the value of α during the calibrations, phase shifter settings for a plurality of beam direction directions or beam angles from the front face of the antenna array can be characterized and stored for future reference.

Figure 8:
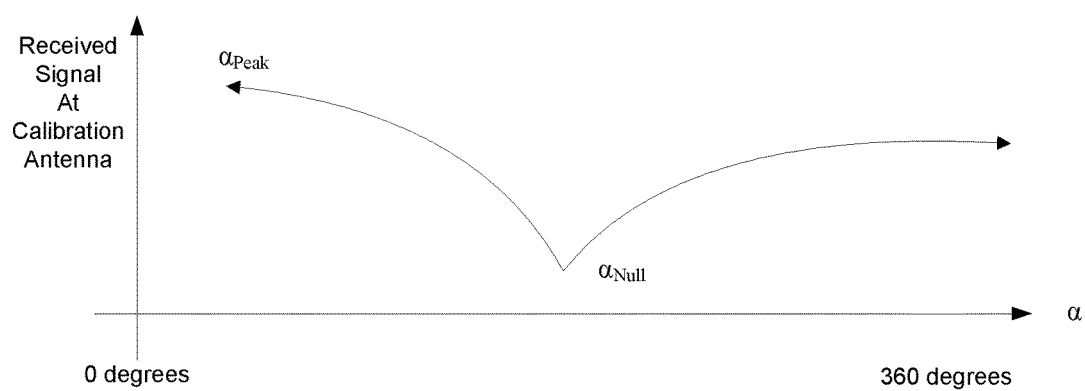
FIG. 8 shows a response of a received calibration antenna while rotating the antenna array, according to an embodiment.

FIG. 8 shows a response of a received calibration antenna 365 while rotating the antenna array, according to an embodiment. As shown, the response can includes peak and null values for different values of the rotation angle α. For at least some embodiments, the phase shifter setting for each phase shifter for different beam angles are determined based at least in part on the locations (phase of rotation of the antenna array) of the peak and null of the response of the received calibration antenna 365 while rotating the antenna array, and based on the calibration of the antenna element of the antenna array.

At least some embodiments include angularly rotating the antenna array relative to the external calibration antenna. For each of a plurality of angular rotations of the antenna array, at least some embodiments include determining of the fine phase shifter calibration for each antenna element of the antenna array. The fine phase shifter calibration for each of the plurality of angular rotations can be stored. Further, for an embodiment, a codebook of the phase shifter settings for each of the plurality of directions is generated based on the angular rotation of the antenna array and the fine phase shifter calibration at each of the plurality of angular rotations.

The determining of the fine phase shifter calibration for each antenna element of the antenna array can be completed using any of the described methods of calibration.

For an embodiment, the antenna array is one of a plurality of antenna arrays. The codebook generated by each of the plurality of antenna arrays can be averaged to generate a golden codebook.

Although specific embodiments have been described and illustrated, the embodiments are not to be limited to the specific forms or arrangements of parts so described and illustrated. The described embodiments are to only be limited by the claims.

What is claimed:

1. A method, comprising:
   generating a codebook of settings for a phase shifter associated with each of a plurality of antenna elements of an antenna array for a plurality of beam directions comprising:
   determining a fine phase shifter calibration for each antenna element of the antenna array, comprising:
   communicating a wireless signal between an external calibration antenna and the antenna array through a beam formed by a reference antenna element of the antenna array and an antenna element of the antenna array being calibrated;
   measuring a signal power of the communicated wireless signal for each of N settings of a digitally selected phase shifter associated with the antenna element of the antenna array being calibrated;
   estimating a virtual signal power of each of M settings of the digitally selected phase shifter based on the signal power measurements of the N settings of the digitally selected phase shifter, wherein M is greater than N, and wherein M and N are integers.

2. The method of claim 1, further comprising:
   calculating an unquantized phase shifter setting for each of the antenna elements of the antenna array for generation of a beam direction of the antenna array.

3. The method of claim 2, further comprising:
   generating the codebook of settings of the phase shifter of each antenna element of the antenna array for the plurality of beam directions based on the estimated the virtual signal power of each of the M settings of the digitally selected phase shifter and the calculated unquantized phase shifter setting for each of the antenna elements of the antenna array.

4. The method of claim 3, further comprising adjusting the codebook of the settings of each of the phase shifters based on the digitally selected phase shifter having a resolution of N.

5. The method of claim 4, further comprising communicating with another device in a direction comprising retrieving a phase setting from the codebook for each antenna of the antenna array corresponding with the direction.

6. The method of claim 4, wherein adjusting the codebook of the settings of each of the phase shifters based on the digitally selected phase shifter having a resolution of N comprises:
   selecting a value of the N-bit phase shifter that results in a phase closest to a value of phase of the codebook before adjusting.

7. The method of claim 1, wherein estimating a virtual signal power of each of the M settings of the digitally selected phase shifter based on the N measurements of the N settings of the digitally selected phase shifter, wherein M is greater than N comprises:
   generating the virtual signal power of each of the M settings by interpolating between the measured signal power values of the N settings.

8. The method of claim 1, wherein estimating the virtual signal power of each of the M settings of the digitally selected phase shifter based on the N measurements of the N settings of the digitally selected phase shifter, wherein M is greater than N comprises:
   generating virtual signal power for each of the M [phase] settings to minimize a mean square error (MMSE) between a measured value at each phase shifter setting and an expected value for a received signal.

9. The method of claim 1, wherein estimating the virtual signal power of each of the M settings of the digitally selected phase shifter based on the N measurements of the N settings of the digitally selected phase shifter, wherein M is greater than N comprises:
   selecting a phase shifter setting that maximizes a likelihood of a received signal.

10. The method of claim 1, wherein the antenna array is one of a plurality of antenna arrays, and further comprising:
   generating a golden code book for a one of the plurality of beam directions comprising:

calibrating each antenna array of the plurality of antenna arrays, comprising:
 communicating the wireless signal between the external calibration antenna and the antenna array through the beam formed by the reference antenna element of the antenna array and the antenna element of the antenna array being calibrated;
 measuring the signal power of the communicated wireless signal for each of N settings of a digitally selected phase shifter associated with the antenna element of the antenna array being calibrated; and
 estimating the virtual signal power of each of the M settings of the digitally selected phase shifter based on the signal power measurements of the N settings of the digitally selected phase shifter, wherein M is greater than N;
averaging the M settings of the plurality of antenna arrays to generate the golden code book for one of the plurality of beam directions.

11. The method of claim 1, wherein the antenna array is one of a plurality of antenna arrays, and further comprising:
 generating a golden code book for the plurality of beam directions comprising:
 calibrating each antenna array of a plurality of antenna arrays, comprising:
  communicating the wireless signal between the external calibration antenna and the antenna array through the beam formed by the reference antenna element of the antenna array and the antenna element of the antenna array being calibrated;
  measuring the signal power of the communicated wireless signal for each of N settings of a digitally selected phase shifter associated with the antenna element of the antenna array being calibrated; and
  estimating the virtual signal power of each of the M settings of the digitally selected phase shifter based on the signal power measurements of the N settings of the digitally selected phase shifter, wherein M is greater than N;
  calculating an unquantized phase shifter setting for each of the antenna elements of the antenna array for generation of a beam direction of the antenna array;
  generating the codebook of settings of the phase shifter of each antenna element of the antenna array based on the estimated the virtual signal power of each of the M settings of the digitally selected phase shifter and the calculated unquantized phase shifter setting for each of the antenna elements of the antenna array;
 averaging the codebook of settings of the phase shifter of each antenna element of each antenna array of the plurality of antenna arrays to generate the golden code book for the plurality of beam directions.

12. The method of claim 1, further comprising:
angularly rotating the antenna array relative to the external calibration antenna;
for each of a plurality of angular rotations of the antenna array, performing the determining of the fine phase shifter calibration for each antenna element of the antenna array;
storing the fine phase shifter calibration for each of the plurality of angular rotations;
generating the codebook of the settings for the phase shifter associated with each of the plurality of antenna elements of the antenna array for each of the plurality of directions based on the angular rotation of the antenna array and the fine phase shifter calibration at each of the plurality of angular rotations.

13. A system for generating a codebook of settings for a phase shifter associated with each of a plurality of antenna elements of an antenna array, comprising:
 the antenna array comprising the plurality of antenna elements;
 an external calibration antenna;
 wherein the system operates to determine a fine phase shifter calibration for each antenna element of the antenna array, comprising the system operating to:
  communicate a wireless signal between the external calibration antenna and the antenna array through a beam formed by a reference antenna element of the antenna array and an antenna element of the antenna array being calibrated;
  measure a signal power of the communicated wireless signal for each of N settings of a digitally selected phase shifter associated with the antenna element of the antenna array being calibrated; and
  estimate a virtual signal power of each of M settings of the digitally selected phase shifter based on the signal power measurements of the N settings of the digitally selected phase shifter, wherein M is greater than N, and wherein M and N are integers.

14. The system of claim 13, wherein the system further operates to:
 calculate an unquantized phase shifter setting for each of the antenna elements of the antenna array for generation of a beam direction of the antenna array.

15. The system of claim 14, wherein the system further operates to:
 generate the codebook of settings of the phase shifter of each antenna element of the antenna array for the plurality of beam directions based on the estimated the virtual signal power of each of the M settings of the digitally selected phase shifter and the calculated unquantized phase shifter setting for each of the antenna elements of the antenna array.

16. The system of claim 15, wherein the system further operates to:
 adjust the codebook of the settings of each of the phase shifters based on the digitally selected phase shifter having a resolution of N.

17. The system of claim 16, wherein the system further operates to:
 communicate with another device in a direction comprising retrieving a phase setting from the codebook for each antenna of the antenna array corresponding with the direction.

18. The system of claim 13, wherein estimating a virtual signal power of each of the M settings of the digitally selected phase shifter based on the N measurements of the N settings of the digitally selected phase shifter, wherein M is greater than N comprises:
 generating the virtual signal power of each of the M setting by interpolating between the measured signal power values of the N settings.

19. The system of claim 16, wherein adjusting the codebook of the settings of each of the phase shifters based on the digitally selected phase shifter having the resolution of N comprises:
 selecting a value of the N-bit phase shifter that results in a phase closest to a value of phase of the codebook before adjusting.

20. The system of claim 13, wherein the antenna array is one of a plurality of antenna arrays, and wherein the system further operates to:
  generate a golden code book for the plurality of beam directions, comprising the system operating to:
  calibrate each antenna array of the plurality of antenna arrays, comprising:
    communicating the wireless signal between the external calibration antenna and the antenna array through the beam formed by the reference antenna element of the antenna array and the antenna element of the antenna array being calibrated;
    measuring the signal power of the communicated wireless signal for each of N settings of a digitally selected phase shifter associated with the antenna element of the antenna array being calibrated; and
    estimating the virtual signal power of each of the M settings of the digitally selected phase shifter based on the signal power measurements of the N settings of the digitally selected phase shifter, wherein M is greater than N;
    calculating an unquantized phase shifter setting for each of the antenna elements of the antenna array for generation of a beam direction of the antenna array;
    generating the codebook of settings of the phase shifter of each antenna element of the antenna array for the plurality of directions based on the estimated the virtual signal power of each of the M settings of the digitally selected phase shifter and the calculated unquantized phase shifter setting for each of the antenna elements of the antenna array;
  wherein the system further operates to:
  average the codebook of settings of the phase shifter of each antenna element of each antenna array of the plurality of antenna arrays to generate the golden code book for the plurality of beam directions.

* * * * *